(12) United States Patent
Fukawa et al.

(10) Patent No.: US 9,191,155 B2
(45) Date of Patent: Nov. 17, 2015

(54) RECEPTION DEVICE, RECEPTION METHOD, AND PROGRAM

(71) Applicants: Tokyo Institute of Technology, Tokyo (JP); Sharp Kabushiki Kaisha, Osaka-shi, Osaka (JP)

(72) Inventors: Kazuhiko Fukawa, Tokyo (JP); Hiroshi Suzuki, Tokyo (JP); Satoshi Suyama, Tokyo (JP); Ryota Yamada, Osaka (JP); Katsuya Kato, Osaka (JP); Takashi Yoshimoto, Osaka (JP)

(73) Assignees: Sharp Kabushiki Kaisha, Osaka (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 14/423,772

(22) PCT Filed: Aug. 22, 2013

(86) PCT No.: PCT/JP2013/072345
§ 371 (c)(1),
(2) Date: Feb. 25, 2015

(87) PCT Pub. No.: WO2014/034505
PCT Pub. Date: Mar. 6, 2014

(65) Prior Publication Data
US 2015/0215072 A1 Jul. 30, 2015

(30) Foreign Application Priority Data

Aug. 29, 2012 (JP) ................. 2012-189135

(51) Int. Cl.
*H04L 1/02* (2006.01)
*H04L 1/00* (2006.01)
(Continued)

(52) U.S. Cl.
CPC ............ *H04L 1/0054* (2013.01); *H04B 7/0413* (2013.01); *H04B 7/0854* (2013.01); *H04L 1/0048* (2013.01); *H04L 1/0052* (2013.01); *H04L 25/0204* (2013.01)

(58) Field of Classification Search
CPC .............. H04B 7/00; H04B 7/02; H04B 7/04; H04B 7/0404; H04B 7/0408; H04B 7/0413; H04B 7/08; H04B 7/0854; H04B 7/0857; H04L 1/02; H04L 1/06; H04L 1/0631
See application file for complete search history.

(56) References Cited

U.S. PATENT DOCUMENTS

2011/0051861 A1* 3/2011 Yang .............................. 375/341
2011/0116581 A1* 5/2011 Yamada et al. ............... 375/341
(Continued)

FOREIGN PATENT DOCUMENTS

JP 2011-004142 A 1/2011

OTHER PUBLICATIONS

PCT/JP2010/058802, published on Dec. 16, 2010.*
(Continued)

*Primary Examiner* — Siu Lee
(74) *Attorney, Agent, or Firm* — Keating & Bennett, LLP (57) ABSTRACT

The present invention is capable of reducing a calculation amount while lessening performance degradation from MLD. The present invention is a reception device that receives a transmit signal which is transmitted from a transmission device by a MIMO transmission scheme. The reception device includes a channel estimation unit (205) that performs channel estimation using a received signal, and calculates a channel estimation value, a signal detection unit (206) that generates a bit log-likelihood ratio by MIMO demultiplexing of a received signal based on the channel estimation value, and a decoding unit (207) that performs error correction decoding with respect to the bit log-likelihood ratio. The signal detection unit (206) includes a transmit signal candidate search unit (301) that searches for a transmit signal candidate based on an error of linear detection depending on the received signal and the channel estimation value, a transmit signal candidate generation unit (302) that generates a transmit signal candidate by hard decision of an output of the transmit signal candidate search unit, and a decision unit (303) that generates the bit log-likelihood ratio using the transmit signal candidate.

2 Claims, 5 Drawing Sheets

(51) Int. Cl.
*H04B 7/08* (2006.01)
*H04B 7/04* (2006.01)
*H04L 25/02* (2006.01)

(56) References Cited

U.S. PATENT DOCUMENTS

2011/0206031 A1* 8/2011 Yoshimoto et al. ........... 370/345
2012/0099679 A1* 4/2012 Yamada et al. ............... 375/341

OTHER PUBLICATIONS

Official Communication issued in International Patent Application No. PCT/JP2013/072345, mailed on Nov. 12, 2013.
Zheng et al., "Near-Optimal Signal Detection Based on the MMSE Detection Using Multi-Dimensional Search for Correlated MIMO Channels," IEICE Trans. Commun., vol. E94-B, No. 8, Aug. 2011, pp. 2346-2356.
Zheng et al., "Low-Complexity Signal Detection by Multi-Dimensional Search for Correlated MIMO Channels," IEEE ICC 2011 Proceedings, Jun. 5, 2011, 5 pages.

* cited by examiner

RECEPTION DEVICE, RECEPTION METHOD, AND PROGRAM

TECHNICAL FIELD

The present invention relates to a reception device, a reception method, and a program that receive a transmit signal which is transmitted from a transmission device by a MIMO transmission scheme.

BACKGROUND ART

In a radio communication field of recent years, MIMO (Multiple Input Multiple Output) transmission which is capable of high speed transmission without widening a frequency bandwidth, using a plurality of transmit-receive antennas, is adopted in many systems. Generally, in the MIMO transmission, in order to transmit a plurality of data streams using the same frequency, MIMO signal detection is needed in a reception device.

Among MIMO signal detection technologies, there is maximum likelihood detection (MLD) as an optimal detection technology. The MLD is a technology of detecting a transmit signal candidate of which a likelihood function is at the maximum, among all transmit signal candidates. Since the transmit signal candidates exponentially increase in accordance with the number of constellations or the number of transmission streams of a modulation scheme, the MLD has a problem that a calculation amount becomes very large.

In NPL 1, it is disclosed a technology of reducing the calculation amount of the MLD by reducing the transmit signal candidates with the low calculation amount while lessening performance degradation from the MLD, and by multidimensionally searching for noise enhancement which is caused by MMSE in a case of making MMSE (Minimum Mean Square Error) detection which is a linear detection scheme as a reference point. A method for generating the transmit signal candidate in NPL 1, will be described.

An $N_R$ dimension received signal vector y is represented as follows. Furthermore, $N_R$ represents the number of receive antennas. Moreover, the number of transmit antennas is represented by $N_T$.

[Math. 1]

$$y = Hs + n \quad (1)$$

Here, H represents a channel matrix of an $N_R$ row and an $N_T$ column, and s represents a transmit signal vector of an $N_T$ dimension, and n represents a noise vector of the $N_R$ dimension.

An MMSE detection result $\hat{x}$ is represented as follows.

[Math. 2]

$$\hat{x} = PH^H y \quad (2)$$

$$P = (H^H H + \sigma_n^2 I_{N_T})^{-1} \quad (3)$$

Here, $\sigma_n^2$ represents noise electric power, and $I_{N_T}$ represents an identity matrix of an $N_T$ row and an $N_T$ column. Moreover, superscript H represents a complex conjugate transpose matrix.

In NPL 1, the transmit signal candidate is generated by quantizing the following $\hat{s}$ using the MMSE detection result $\hat{x}$.

[Math. 3]

$$\tilde{s} = \hat{x} + \sum_{k=1}^{N_P} a_k \lambda_k^{1/2} v_k \quad (4)$$

$N_P$ is $1 \leq N_P \leq N_T$, and $a_k$ is calculated as follows.

[Math. 4]

$$a = e(m \cdot k)(\tilde{c}_k^H \tilde{c}_k)^{-1} \tilde{c}_k \quad (5)$$

$$a^H = [a_1^*, a_2^*, \ldots, a_{N_P}^*] \quad (6)$$

$$e(m, k) = b(m) - (\hat{x})_k \quad (7)$$

Furthermore, b(m) is one of the constellations of the modulation scheme, and is $1 \leq m \leq M$. M is the number of constellations, and for example, if the modulation scheme is QPSK (Quadrature Phase Shirt Keying), M=4, and if the modulation scheme is 16QAM (Quadrature Amplitude Modulation), M=16. Moreover, $(\cdot)_k$ represents a k-th element of the vector. Additionally, $c\tilde{\ }_k$ is represented as follows.

[Math. 5]

$$\tilde{c}_k^H = [\lambda_1^{1/2}(v_1)_k, \lambda_2^{1/2}(v_2)_k, \ldots, \lambda_{N_P}^{1/2}(v_{N_P})_k] \quad (8)$$

$\lambda_1$ to $\lambda_{N_P}$, and $v_1$ to $v_{N_P}$ represent an eigenvalue which is obtained by eigenvalue decomposition of P, and an eigenvector thereof, respectively.

[Math. 6]

$$P = VDV^H \quad (9)$$

$$V = [v_1, v_2, \ldots, v_{N_T}] \quad (10)$$

$$D = diag[\lambda_1, \lambda_2, \ldots, \lambda_{N_T}] \quad (11)$$

Furthermore, $diag[\cdot]$ represents a diagonal matrix.

CITATION LIST

Non Patent Literature

NPL 1: Liming Zheng, Kazuhiko Fukawa, Hiroshi Suzuki, Satoshi Suyama, "Near-Optimal Signal Detection Based on the MMSE Detection Using Multi-Dimensional Search for Correlated MIMO Channels," IEICE transactions on Communications, Vol. e94-B, No. 8, August 2011.

SUMMARY OF INVENTION

Technical Problem

However, the technology which is disclosed in NPL 1, has a problem that the eigenvalue and the eigenvector need to be calculated in a case of generating the transmit signal candidate, and the calculation amount is still large.

The present invention is made in view of such circumstances, and an object thereof is to provide a reception device, a reception method, and a program which are capable of reducing a calculation amount while lessening performance degradation from MLD.

Solution to Problem

The present invention provides a reception device which receives a transmit signal transmitted from a transmission device by a MIMO transmission scheme, including a channel estimation unit that performs channel estimation using a received signal, and calculates a channel estimation value, a signal detection unit that generates a bit log-likelihood ratio by MIMO demultiplexing of a received signal based on the channel estimation value, and a decoding unit that performs error correction decoding with respect to the bit log-likelihood ratio, in which the signal detection unit includes a transmit signal candidate search unit that searches for a transmit signal candidate based on an error of linear detection depending on the received signal and the channel estimation value, a transmit signal candidate generation unit that generates a transmit signal candidate by hard decision of an output of the transmit signal candidate search unit, and a decision unit that generates the bit log-likelihood ratio using the transmit signal candidate.

Here, the signal detection unit may calculate an error of the linear detection from a component which causes noise enhancement among weight of the linear detection, and may calculate an error of the linear detection based on an equivalent amplitude after the linear detection.

Moreover, the transmit signal candidate search unit may search for a transmit signal candidate based on an error of the linear detection, by making a linear detection result as a reference point, and may search for a transmit signal so that a different transmit signal candidate is generated by the transmit signal candidate generation unit.

The present invention provides a reception method for receiving a transmit signal transmitted from a transmission device by a MIMO transmission scheme, including a channel estimation step of performing channel estimation using a received signal, and calculates a channel estimation value, a signal detection step of generating a bit log-likelihood ratio by MIMO demultiplexing of a received signal based on the channel estimation value, and a decoding step of performing error correction decoding with respect to the bit log-likelihood ratio, in which the signal detection step includes a transmit signal candidate search step of searching for a transmit signal candidate based on an error of linear detection depending on the received signal and the channel estimation value, a transmit signal candidate generation step of generating a transmit signal candidate by hard decision of a result of searching for a transmit signal candidate, and a decision step of generating the bit log-likelihood ratio using the transmit signal candidate.

The present invention provides a program causing a computer to execute each step of the reception method.

Advantageous Effects of Invention

According to the present invention, even though an eigenvalue and an eigenvector are not calculated, it is possible to multidimensionally search for noise enhancement, and to drastically reduce a calculation amount without performance degradation in comparison with the related art.

DESCRIPTION OF EMBODIMENTS

Hereinafter, details of the present invention will be described using the drawings.

In the following embodiments, the number of transmit antennas is represented by $N_T$, and the number of receive antennas is represented by $N_R$. Moreover, a transmission data stream is transmitted from each transmit antenna, that is, it is described that the number of data streams is equal to the number of transmit antennas, but the present invention is not limited thereto. The present invention also includes a case that a plurality of data streams of which the number is smaller than the number of transmit antennas, are transmitted. Still more, in the following embodiments, a case of applying the present invention to OFDM (Orthogonal Frequency Division Multiplexing), is described, but the present invention is not limited thereto.

First Embodiment

Figure 1:
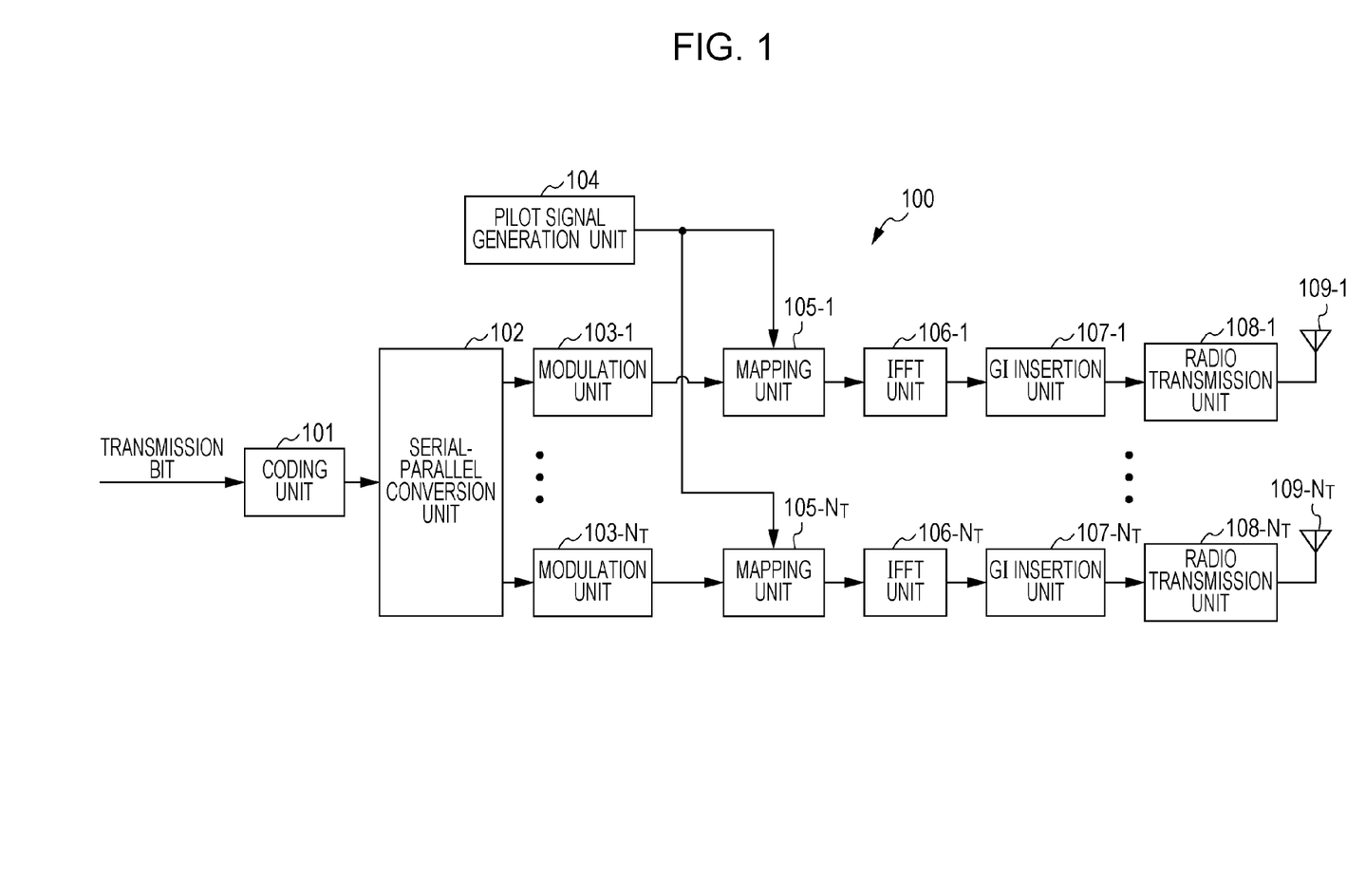
FIG. 1 is a block diagram illustrating a configuration of a transmission device according an embodiment.

FIG. 1 is a block diagram illustrating a configuration of a transmission device 100 according to a first embodiment.

The transmission device 100 includes a coding unit 101, a serial-parallel conversion unit 102, modulation units 103-1 to 103-$N_T$, a pilot signal generation unit 104, mapping units 105-1 to 105-$N_T$, IFFT (Inverse Fast Fourier Transform) units 106-1 to 106-$N_T$, GI (Guard Interval) insertion units 107-1 to 107-$N_T$, radio transmission units 108-1 to 108-$N_T$, and transmit antennas 109-1 to 109-$N_T$.

The coding unit 101 generates a coding bit by performing error correction coding of a transmission bit such as a turbo code or an LDPC (Low Density Parity Check) code. The serial-parallel conversion unit 102 converts the coding bit in serial-parallel. Each coding bit which is converted in serial-parallel, is mapped into a modulation symbol such as PSK (Phase Shift Keying) or QAM (Quadrature Amplitude Modulation) by the modulation units 103-1 to 103-$N_T$.

The mapping units 105-1 to 105-$N_T$ arrange a pilot signal which is generated by the pilot signal generation unit 104, and the modulation symbol, into a resource which is defined by time and a frequency. Outputs of the mapping units 105-1 to 105-$N_T$ are converted with the time and the frequency by the IFFT units 106-1 to 106-$N_T$, and are inserted into guard intervals by the GI insertion units 107-1 to 107-$N_T$. With respect to the outputs of the mapping units 105-1 to 105-$N_T$, digital-analog conversion, waveform shaping, frequency conversion or the like is performed by the radio transmission units 108-1 to 108-$N_T$, and the outputs of the mapping units 105-1 to 105-$N_T$ are transmitted from the transmit antennas 109-1 to 109-$N_T$.

Figure 2:
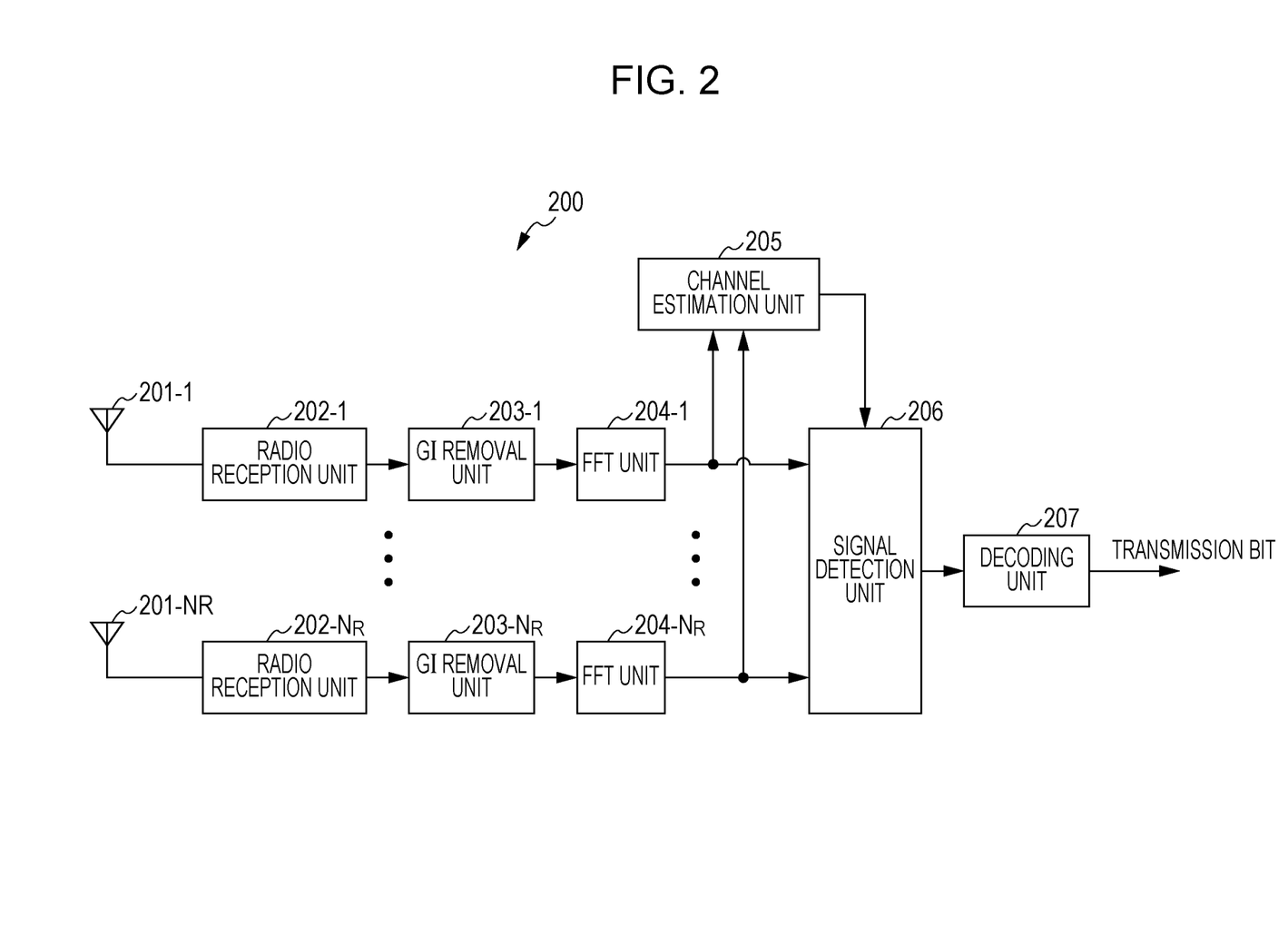
FIG. 2 is a block diagram illustrating a configuration of a reception device according the embodiment.
Figure 3:
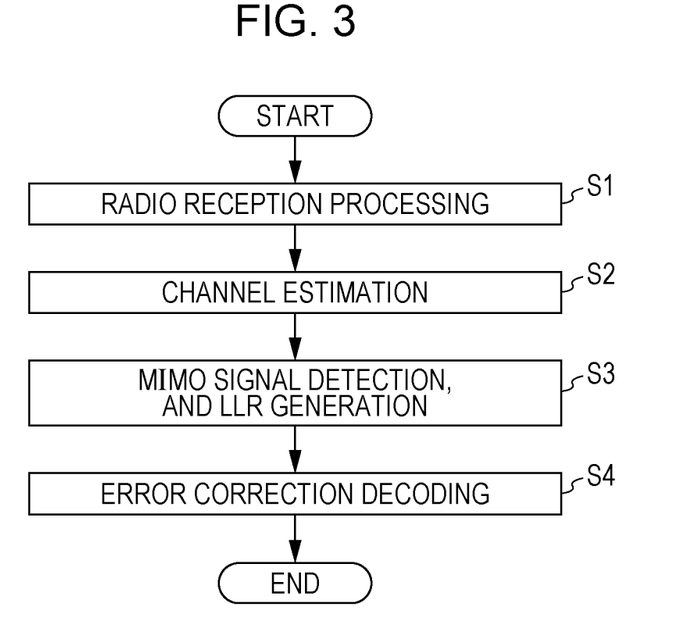
FIG. 3 is a flowchart illustrating an operation of the reception device according to the embodiment.

FIG. 2 is a block diagram illustrating a configuration of a reception device 200 according to the first embodiment. FIG. 3 is a flowchart illustrating an operation of the reception device 200.

The reception device 200 includes receive antennas 201-1 to 201-$N_R$, radio reception units 202-1 to 202-$N_R$, GI removal units 203-1 to 203-$N_R$, FFT (Fast Fourier Transform) units 204-1 to 204-$N_R$, a channel estimation unit 205, a signal detection unit 206, and a decoding unit 207.

A received wave which is received by the receive antennas 201-1 to 201-$N_R$, is output as a received signal by performing the frequency conversion, filtering, and the digital-analog conversion by the radio reception units 202-1 to 202-$N_R$ (step S1). The guard intervals are removed by the GI removal units 203-1 to 203-$N_R$, and the received signal is converted with the time and the frequency by the FFT units 204-1 to 204-$N_R$. The pilot signal is output to the channel estimation unit 205, and a data signal is output to the signal detection unit 206. The channel estimation unit 205 performs channel estimation using the pilot signal (step S2). The signal detection unit 206 generates a coded bit LLR (Log Likelihood Ratio) by performing MIMO signal detection using the received signal and a channel estimation value (step S4). The details of the signal detection unit 206 will be described later. The decoding unit 207 performs error correction decoding with respect to the coded bit LLR, and calculates the transmission bit (step S5).

Figure 4:
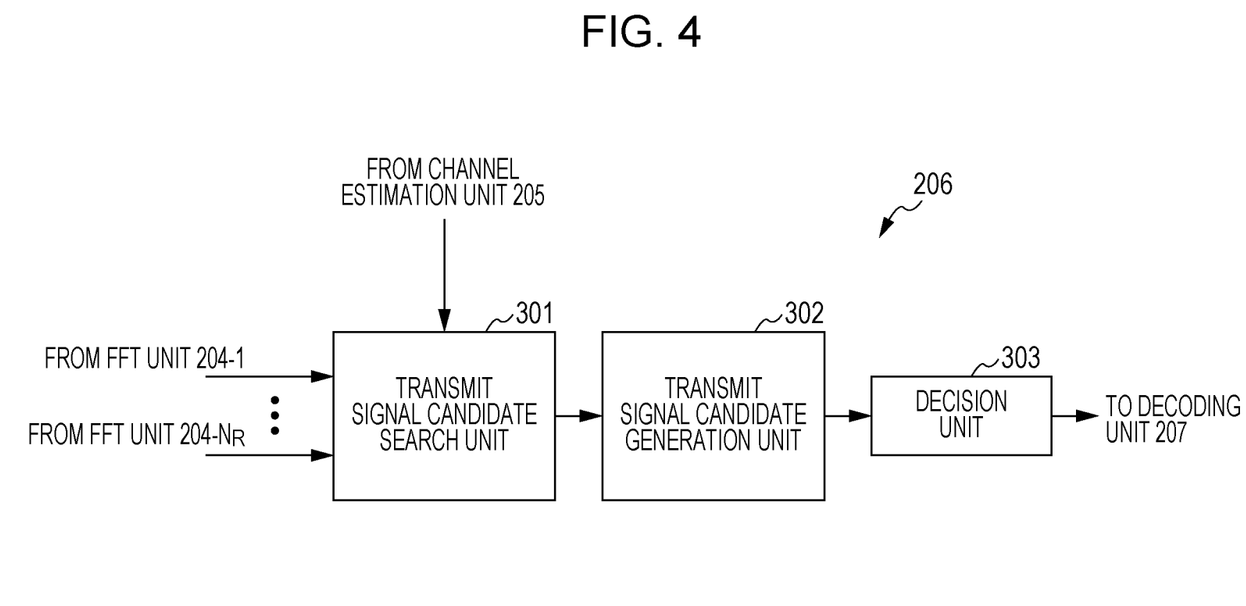
FIG. 4 is a block diagram illustrating a configuration of a signal detection unit according the embodiment.
Figure 5:
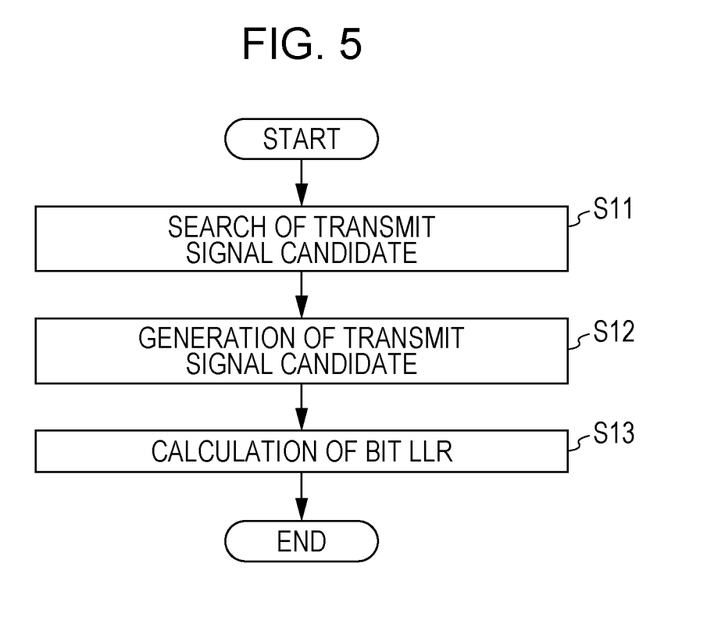
FIG. 5 is a flowchart illustrating an operation of the signal detection unit according to the embodiment.

FIG. 4 is a block diagram illustrating a configuration of the signal detection unit 206, and FIG. 5 is a flowchart illustrating an operation (step S3) of the signal detection unit 206.

The signal detection unit 206 includes a transmit signal candidate search unit 301, a transmit signal candidate generation unit 302, and a decision unit 303.

The transmit signal candidate search unit 301 searches for a transmit signal candidate with a low calculation amount in consideration of linear detection performance degradation, that is, an error of the linear detection, by making the linear detection such as ZF (Zero Forcing) detection or MMSE (Minimum Mean Square Error) detection depending on the data signal from the FFT unit 204 and the channel estimation value from the channel estimation unit 205, as a reference point (step S11). The transmit signal candidate generation unit 302 generates the transmit signal candidate by quantizing an output (result of searching for a transmit signal) of the transmit signal candidate search unit 301 (step S12). The decision unit 303 calculates the bit LLR of a maximum likelihood sequence, using the transmit signal candidate which is obtained by the transmit signal candidate generation unit 302 (step S13). The details of the transmit signal candidate search unit 301 will be described using expressions.

An $N_R$ dimension received signal vector y in a certain subcarrier (a subcarrier number will be omitted), is represented as follows.

[Math. 7]

$$y = Hs + n \qquad (12)$$

Here, H is a channel matrix of an $N_R$ row and an $N_T$ column, and s is an $N_T$ dimension transmit signal vector, and n is an $N_R$ dimension noise vector.

An MMSE detection result $\hat{x}$ is calculated as follows.

[Math. 8]

$$\hat{x} = PH^H y \qquad (13)$$

$$P = (H^H H + \sigma_n^2 I_{N_T})^{-1} \qquad (14)$$

Furthermore, in a case of using the ZF detection, $P = (H^H H)^{-1}$.

If the error of the MMSE detection is referred to as e, e is calculated as follows.

[Math. 9]

$$e = s - \hat{x} \qquad (15)$$

$$\langle ee^H \rangle = \sigma_n^2 P \qquad (16)$$

P is a component which causes noise cooperation among weight of the linear detection.

[Math. 10]

$$\langle e \rangle = 0 \qquad (17)$$

If e is in a complex Gauss process, a probability density function of e is calculated as follows.

[Math. 11]

$$p(e) = \frac{1}{(\pi \sigma_n^2)^{N_T} \det P} \exp(-e^H \sigma_n^{-2} P^{-1} e) \qquad (18)$$

Equation (18) is a likelihood function, and the following Equation (19) may be the minimum so that the likelihood function is the maximum.

[Math. 12]

$$e^H P^{-1} e \qquad (19)$$

b(m) represents one of the modulation symbol. If the number of constellations of a modulation scheme is referred to as M, $1 \leq m \leq M$. For example, in a case of QPSK, M=4, and in a case of 16QAM, M=16.

[Math. 13]

$$(e)_k = b(m) - (\hat{x})_k = e(m, k) \qquad (20)$$

Under a constraint condition as described above, a minimum error $e_{opt}$ is calculated. Furthermore, $1 \leq k \leq N_T$. $e_{opt}$ can be calculated using a method of Lagrange undetermined multipliers.

[Math. 14]

$$e_{opt} = -\frac{\lambda^+}{2} P c_k \qquad (21)$$

Here, $c_k$ is a vector in a case that a k-th element is 1 and the elements other than the k-th element are 0. Moreover, $\lambda$ represent a Lagrange multiplier, and superscript * represents complex conjugate.

Here, Expression 15 is calculated as follows.

[Math. 15]

$$c_k^H e_{opt} = -\frac{\lambda^+}{2} c_k^H P c_k = e(m, k) \qquad (22)$$

$$-\frac{\lambda^+}{2} = (c_k^H P c_k)^{-1} e(m, k) \qquad (23)$$

Finally, $e_{opt}$ is calculated as follows.

[Math. 16]

$$e_{opt} = \frac{e(m, k)}{(P)_{kk}} \begin{vmatrix} (P)_{1k} \\ (P)_{2k} \\ \vdots \\ (P)_{N_z k} \end{vmatrix} \qquad (24)$$

The transmit signal candidate search unit 301 calculates $e_{opt}$ with respect to all of m and k, and outputs a search signal $\hat{s}(m, k) = \hat{x} + e_{opt}$.

The transmit signal candidate generation unit 302 generates the transmit signal candidate by quantizing $\hat{s}(m, k)$. $e_{opt}$ is $M \times N_T$, and if 1 is added to the MMSE detection result, the transmit signal candidates are generated as the number of M×$N_T$+1. The decision unit 303 calculates the bit LLR of the maximum likelihood sequence as follows.

[Math. 17]

$$\lambda_{k,n} = -\frac{1}{\sigma_n^2}\min_{b^+} \| y - \hat{H}s_b \|^2 + \frac{1}{\sigma_n^2}\min_{b^-} \| y - \hat{H}s_b \|^2 \quad (25)$$

Here, $\lambda_{k,n}$ is a log likelihood ratio of an n-th bit of the modulation symbol which is transmitted from a k-th transmit antenna. Moreover, $s_b$ represents the transmit signal candidate which is determined by b=[$b_{1,1}, \ldots, b_{k,n}, \ldots, b_{NT,N}$]. $b^+$ represents a case of $b_{k,n}$=1 among b, and $b^+$=[$b_{1,1}, \ldots, b_{k,n}$=1, $\ldots, b_{NT,N}$]. $b^-$ represents a case of $b_{k,n}$=0 among b, and $b^-$=[$b_{1,1}, \ldots, b_{k,n}$=0, $\ldots, b_{NT,N}$]. Accordingly, $\lambda_{k,n}$ is calculated by a difference between a minimum matrix which is generated using $b^+$ and a minimum matrix which is generated using $b^-$. Moreover, as shown by Equation (20), since the transmit signal candidates are generated with respect to all of the constellations in a certain stream, it is possible to certainly calculate the bit LLR.

According to the first embodiment in this manner, even though an eigenvalue and an eigenvector are not calculated, it is possible to multidimensionally search for noise enhancement. Moreover, the performance that is equal to the technology which is disclosed in NPL 1, is obtained. Still more, in the calculation of Equation (24), real number division may be performed by one time, and complex multiplying may be performed by ($N_T$−1) times. In the generation of the transmit signal candidate, complex addition may be performed by $N_T$ times, and complex quantization may be performed by $N_T$ times. Since the complex multiplying needs to be performed at least by square of $N_T$ in order to calculate the eigenvalue and the eigenvector, it is possible to drastically reduce the calculation amount without the performance degradation in comparison with the related art.

Second Embodiment

In a second embodiment, a method for calculating the transmit signal candidate by a method which is different from the first embodiment, will be described. Furthermore, since a difference to the first embodiment is the operation of the transmit signal candidate search unit 301 in FIG. 3, and others are the same as the first embodiment, here, only the operation of the transmit signal candidate search unit 301 will be described.

In the second embodiment, as the following equations, a transmit signal $s_k$ of a k-th stream is fixed to b(m), and the search signal $\hat{s}$(m, k) is generated by performing MMSE.

[Math. 18]

$$\hat{s}(m,k)=c_k b(m)+W(y-Hc_k b(m)) \quad (26)$$

$$W=(H^H-c_k h_k^H)(HH^H+\sigma_n^2 I_{N_R}-h_k h_k^H)^{-1} \quad (27)$$

Here, $h_k$ is a k-th column vector of the matrix H.

Equation (27) is rearranged using an auxiliary theorem of an inverse matrix, and if the search signal is calculated again, the search signal is represented as follows.

[Math. 19]

$$\hat{s}(m,k) = \hat{x} + \frac{e(m,k)}{(P')_{kk}} P' c_k \quad (28)$$

$$P' = PH^H H - I_{N_1} \quad (29)$$

In this manner, in the second embodiment, the transmit signal may be searched using P'. Equation (29) may be calculated intactly, but $PH^H H$ of a first clause of Equation (29) is an equivalent amplitude after the MMSE, and the calculation thereof can be performed as follows. First, the equivalent amplitude to be calculated is set to X.

[Math. 20]

$$PH^H H=X \quad (30)$$

If Cholesky decomposition of $P^{-1}$ is represented as Equation (31), it is possible to solve a simultaneous equation of Equation (32) by using a solution (Cholesky decomposition method) using the Cholesky decomposition.

[Math. 21]

$$P^{-1}=LL^H \quad (31)$$

$$LL^H(X)_k=(H^H H)_k \quad (32)$$

Furthermore, L is a lower triangular matrix. If $(X)_k$ is calculated with respect to all k, it is possible to calculate the equivalent amplitude.

If the search of the transmit signal is performed using the equivalent amplitude in this manner, even though the inverse matrix is not directly calculated, the inverse matrix can be calculated, and there is an effect which is accurately calculable at the time of installation at a fixed point.

Moreover, it is possible to solve $P^{-1}$ by using the modified Cholesky decomposition as follows.

[Math. 22]

$$P^{-1}=LDL^H \quad (33)$$

$$LDL^H(X)_k=(H^H H)_k \quad (34)$$

Here, L is a lower triangular matrix of which a diagonal element is 1. Moreover, D is a diagonal matrix.

If the modified Cholesky decomposition is used, the number of times of the division at the time of calculating $(X)_k$ becomes ½ in comparison with a case of using the Cholesky decomposition, and it is possible to calculate the equivalent amplitude with the low calculation amount.

Furthermore, in the embodiments, the coding bit is converted in serial-parallel, and is made as a data stream, but the present invention is not limited thereto. The coding bit may be calculated by coding per stream.

Moreover, in the embodiments, the bit log-likelihood ratio is calculated by the signal detection unit 206, but a hard decision value may be calculated.

Furthermore, a program which is operated in the reception device according to the present invention, is a program (program causing a computer to function) controlling a CPU or the like, in order to realize functions of the embodiments according to the present invention. Therefore, information which is handled by the devices, is temporarily accumulated in a RAM at the time of the processing. Thereafter, the information is stored in various types of ROMs and HDDs, and is read out by the CPU as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the embodiments are not only realized, but the functions of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In this case, a storage device of the server computer is also included in the present invention. Still more, in the embodiments described above, a portion of a mobile station device and a base station device, or the whole thereof may be realized as an LSI which is typically an integrated circuit. Each functional block of the reception device may be individually chipped, or a portion thereof, or the whole thereof may be chipped by being integrated. In a case of making each functional block as an integrated circuit, an integrated circuit control unit controlling the integrated circuits, is added.

Additionally, the method for making an integrated circuit is not limited to the LSI, and may be realized by a single-purpose circuit or a general-purpose processor. Moreover, in a case of an appearance of a technology for making an integrated circuit which replaces the LSI due to an advance of a semiconductor technology, it is possible to use an integrated circuit depending on the technology.

As described above, the embodiments of the present invention are described in detail with reference to the drawings, but specific configurations thereof are not limited to the embodiments. A design or the like in the scope without departing the gist of the present invention, is also included in the scope of the claims.

REFERENCE SIGNS LIST

200 RECEPTION DEVICE
201 RECEIVE ANTENNA
202 RADIO RECEPTION UNIT
203 REMOVAL UNIT
204 FFT UNIT
205 CHANNEL ESTIMATION UNIT
206 SIGNAL DETECTION UNIT
207 DECODING UNIT
301 TRANSMIT SIGNAL CANDIDATE SEARCH UNIT
302 TRANSMIT SIGNAL CANDIDATE GENERATION UNIT
303 DECISION UNIT

The invention claimed is:

1. A reception device which receives a plurality of transmit signals which are transmitted from a transmission device by a MIMO transmission scheme, comprising:
channel estimation circuitry that performs channel estimation using a received signal, and calculates a channel estimation value;
signal detection circuitry that generates a bit log-likelihood ratio by MIMO demultiplexing of a received signal based on the channel estimation value; and
decoding circuitry that performs error correction decoding with respect to the bit log-likelihood ratio, wherein
the signal detection circuitry includes:
    transmit signal candidate search circuitry that generates a search signal made from a linear detection result with respect to the plurality of transmit signals, and an error component between the linear detection result and the plurality of transmit signals,
    transmit signal candidate generation circuitry that generates a transmit signal candidate by hard decision of the search signal, and
    decision circuitry that generates the bit log-likelihood ratio using the transmit signal candidate; and
one of the plurality of transmit signals is fixed to a certain modulation symbol to generate the search signal from the one of the plurality of transmit signals, and the linear detection result of a reception signal in which the one of the plurality of transmit signals fixed to the certain modulation symbol is canceled.

2. A reception method in a reception device which receives a plurality of transmit signals which are transmitted from a transmission device by a MIMO transmission scheme, comprising:
a channel estimation step of performing channel estimation using a received signal, and calculates a channel estimation value;
a signal detection step of generating a bit log-likelihood ratio by MIMO demultiplexing of a received signal based on the channel estimation value; and
a decoding step of performing error correction decoding with respect to the bit log-likelihood ratio, wherein
the signal detection step includes:
    a transmit signal candidate search step of generating a search signal made from a linear detection result with respect to the plurality of transmit signals, and an error component between the linear detection result and the plurality of transmit signals,
    a transmit signal candidate generation step of generating a transmit signal candidate by hard decision of the search signal, and
    a decision step of generating the bit log-likelihood ratio using the transmit signal candidate; and
one of the plurality of transmit signals is fixed to a certain modulation symbol to generate the search signal from the one of the plurality of transmit signals, and the linear detection result of a reception signal in which the one of the plurality of transmit signals fixed to the certain modulation symbol is canceled.

* * * * *